(12) United States Patent
Kalpio et al.

(10) Patent No.: US 6,343,323 B1
(45) Date of Patent: Jan. 29, 2002

(54) RESOURCE RETRIEVAL OVER A SOURCE NETWORK DETERMINED BY CHECKING A HEADER OF THE REQUESTED RESOURCE FOR ACCESS RESTRICTIONS

(75) Inventors: Karri Kalpio, Helsinki; Mika P. Nieminen; Jorma Rinkinen, both of Espoo, all of (FI)

(73) Assignee: More Magic Software MMS Oy, Espoo (FI)

( * ) Notice: Subject to any disclaimer, the term of this patent is extended or adjusted under 35 U.S.C. 154(b) by 0 days.

(21) Appl. No.: 09/213,753

(22) Filed: Dec. 17, 1998

(30) Foreign Application Priority Data

Dec. 18, 1997 (FI) .................................................. 974556

(51) Int. Cl.[7] .............................................. G06F 15/16
(52) U.S. Cl. ........................ 709/229; 709/202; 709/217; 709/224; 709/225; 705/34; 705/40; 705/44
(58) Field of Search ................................ 709/202, 224, 709/225, 217, 229; 705/34, 40, 44

(56) References Cited

U.S. PATENT DOCUMENTS

| | | | | |
|---|---|---|---|---|
| 5,586,260 A | * | 12/1996 | Hu | 713/201 |
| 5,812,776 A | * | 9/1998 | Gifford | 709/217 |
| 5,815,574 A | * | 9/1998 | Fortinsky | 380/25 |
| 5,815,665 A | | 9/1998 | Teper et al. | |
| 5,845,267 A | * | 12/1998 | Ronen | 705/40 |
| 5,878,233 A | * | 3/1999 | Schloss | 709/225 |
| 5,991,810 A | * | 11/1999 | Shapiro et al. | 709/229 |
| 6,006,268 A | * | 12/1999 | Coile et al. | 709/227 |
| 6,035,281 A | * | 3/2000 | Crosskey et al. | 705/14 |
| 6,148,340 A | * | 11/2000 | Bittinger et al. | 709/224 |
| 6,173,311 B1 | * | 1/2001 | Hassett et al. | 709/202 |

FOREIGN PATENT DOCUMENTS

| | | |
|---|---|---|
| WO | WO97/15885 | 5/1997 |
| WO | WO98/00951 | 1/1998 |

\* cited by examiner

*Primary Examiner*—Zarni Maung
*Assistant Examiner*—Nabil El-Hady
(74) *Attorney, Agent, or Firm*—Arent Fox Kintner Plotkin & Kahn, PLLC

(57) ABSTRACT

A method of downloading resources to a client (1) from a content server (3) over a data network. A resource request message is sent from the client (1) and is intercepted at a proxy (2) located in the data network between the client (1) and the content server (3). A header request is sent from the proxy (2) to the content server (3), requesting the content server (3) to transmit a header, associated with the requested resource, to the proxy (2). The header is received at the proxy (2) which determines whether or not the header contains billing and/or access restrictions. In the event that the header does contain billing and/or access restrictions, the client's right to receive the requested resource is authenticated and, providing the client is authenticated, the resource request message is delivered from the proxy (2) to the content server (3) and subsequently the resource is downloaded from the content server (3) to the client (1).

10 Claims, 2 Drawing Sheets

RESOURCE RETRIEVAL OVER A SOURCE NETWORK DETERMINED BY CHECKING A HEADER OF THE REQUESTED RESOURCE FOR ACCESS RESTRICTIONS

FIELD OF THE INVENTION

The present invention relates to a method and apparatus for retrieving resources from a content server over a data network and in particular, though not necessarily, to a method and apparatus for enhancing World Wide Web services.

BACKGROUND OF THE INVENTION

The Internet is a global open communications network connecting a great number of local area networks, such as networks of various companies, universities and other organizations. These networks may be used by a large number of independent workstations and computer devices. An individual client may have a direct connection to these local area networks or may be connected to them through a PSTN (Public Switched Telephone Network) or an ISDN (Integrated Digital Services network) using a modem or similar device.

The two most often used communication protocols for the Internet are TCP and IP (Transport Control Protocol and Internet Protocol respectively). In most cases the service provider provides the various services by utilizing so called WWW (World Wide Web) and HTTP (HyperText Transfer Protocol) protocols to provide a graphical Internet interface for the client terminal which is typically a data processing device such as a microcomputer. The WWW contains, e.g. HTML documents (HyperText Markup Language) i. e. "hyperdocuments", one such document forming one entity which can contain text, pictures, even moving pictures, sound, links to other documents and even links to other services. The skilled person is aware that "services" refers in this connection to various kinds of features, products, services such as electronic mail, electronic phone book, entertainment, assistance and advisory services etc., advertisement, games, videos and the like which are accessible through various communications networks.

SUMMARY OF THE PRESENT INVENTION

It is an object of the present invention to enhance the operation of a data network content server by enabling it to communicate transparently with an external billing and authentication server or service, e.g. an Internet Service Broker, to offer value-added logistic services.

According to a first aspect of the present invention there is provided a method of downloading resources to a client from a content server over a data network, the method comprising:

sending a resource request message from the client;
intercepting the sent resource request message at a proxy located in the data network between the client and the content server;
sending a header request from the proxy to the content server requesting the content server to transmit a header, associated with the requested resource, to the proxy;
receiving the header at the proxy and determining whether or not the header contains billing and/or access restrictions;
in the event that the header does contain billing and/or access restrictions, authenticating the client's right to receive the requested resource; and
providing the client is authenticated, delivering the resource request message from the proxy to the content server and subsequently downloading the resource from the content server to the client.

Preferably, said step of authenticating the client's right to receive the requested resource comprises conducting an authentication dialogue with an Internet Service Broker (ISB). The ISB is a software server platform which centralizes the logistic services on behalf of other content services. These logistic services include, without limitation, client identification and authentication, access control to the network resources, unified billing interface and client identification delivery for service customization. The present invention may provide a method for implementing the interface for these logistic services for standard web server with standard HTML, such that there is no need to make any proprietary modification.

The authentication step may additionally comprise a dialogue between the ISB and the client following the setting up of the dialogue between the proxy and the ISB.

The present invention may be combined with the Internet Service Broker concept which is described in PCT/FI97/00426.

Preferably, the proxy mediates and stores or caches data to minimize loading time of commonly requested resources. When a certain hypertext document is requested several times from one or more clients, the subsequent request(s) may be met by giving the already fetched document instead of requesting it again from the original source. This generally requires confirmation that the original document has not changed between successive requests.

The proxy may be a program running on a separate computer device placed "in front" of the computer device on which the content server is running. Alternatively, the proxy is a program running on the same computer as the content server. The proxy monitors the data traffic and provides the required logistic service when a certain HTTP message is detected.

According to a second aspect of the present invention there is provided a proxy for controlling billing and access in a data network, the proxy comprising;

means for intercepting a resource request message sent from a client and intended for a content server;
means for sending a header request to the content server requesting the content server to transmit a header, associated with the requested resource, to the proxy;
means for receiving the transmitted header and for determining whether or not the header contains billing and/or access restrictions;
means for authenticating the client's right to receive the requested resource in the event that the header does contain billing and/or access restrictions; and
means for delivering the resource request message to the content server in the event that the client is authenticated.

According to a third aspect of the present invention there is provided a computer memory encoded with executable instructions representing a computer program for causing a computer system connected to a data network to operate as a proxy, the proxy operating to:

intercept a resource request message sent from a client and intended for a content server;
send a header request to the content server requesting the content server to transmit a header, associated with the requested resource, to the proxy;
receive the transmitted header and for determining whether or not the header contains billing and/or access restrictions;

authenticate the client's right to receive the requested resource in the event that the header does contain billing and/or access restrictions; and deliver the resource request message to the content server in the event that the client is authenticated.

DETAILED DESCRIPTION OF CERTAIN EMBODIMENTS

Figure 1:
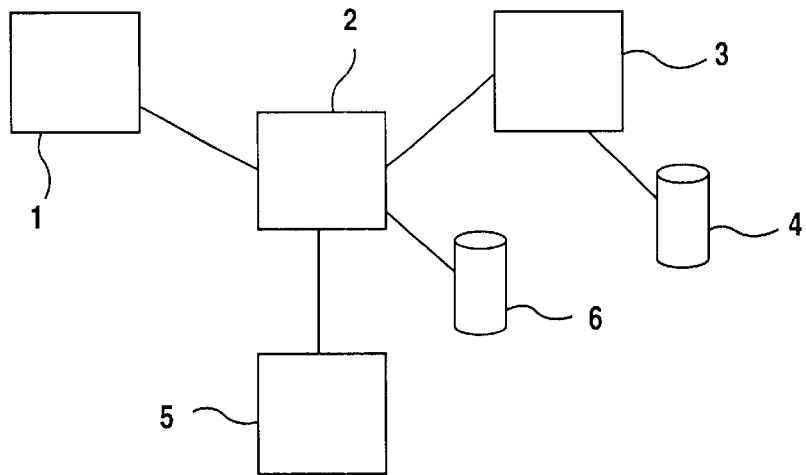
FIG. 1 is a schematic representation of the architecture of an embodiment of the present invention.

FIG. 1 is a schematic presentation of the architecture of an embodiment of the present invention. A User or client 1 is the end user using a World Wide Web Browser which supports identification items which a WWW Server can give to the browser and which the browser stores and gives back only to the server it originally received them from. These information items, e.g. cookies, enable the connection of several connectionless requests into a client session.

Proxy 2 is a software and/or hardware component that monitors the data traffic and takes care of the access control and billing using the Internet Service Broker (ISB) functionality. WWW Server 3 is a standard httpd program which delivers an HTML page, and possible images, sound and other digital data linked into the page, upon a client's request. The WWW Server 3 supports client defined headers by, for example, .htaccess access control mechanism, custom headers or cgi-bin programs. Most current WWW servers, for example APACHE™ or those provided by NETSCAPE™ or MICROSOFT™, have this functionality.

WWW Data Store 4 is a file system, database or the like, where the client accessible data is stored, whilst ISB 5 is the Internet Service Broker which defines unified interfaces for client identification and authentication, and for billing. Proxy Data Store 6 provides a cache in which the proxy 2 stores frequently requested documents.

Before describing the operation of a data retrieving system used by the network of FIG. 1, it is useful to describe the nature and role of the so-called "Header" which is associated with request reply messages sent over the Internet. The Header is a part of the message packet which contains control data related to the packet. For the purpose of the present example, these headers are part of the HTTP protocol (or HTTPS which is similar to HTTP but includes means for some security functionality). Thus, these headers have the following form:

Header-field-name: value of the field in which the "Header-field-name" specifies the name of the header field and the "value of the field" is a character string, starting after the field separator and ending with the next line feed. This header structure makes it relatively easy to add more functionality to the protocol by adding more fields, as long as the meaning of the existing fields is maintained.

An example of such a field is

Content-length: 5345 where field name defines that this field contains information about the amount of data in the message (excluding the header information) and the number in the value part of the field is interpreted as the data amount in bytes as implicitly defined by the meaning of field. The present method uses a packet that is built by following the same design principles as the protocol which it relies upon. However, whilst the usual use of the protocol headers is point-to-point connections (i.e. controlling the traffic from the starting point to the end point) or between two hops (i.e. two nodes directly connected together and interacting with each other), the use of the header fields in this method is to allow interception at a node (the "proxy") which is between the starting point and the end point.

The header is used to inform the intermediate node about billing information associated with a resource which can be purchased through a public connection network, e.g. the Internet, and which is intended to be intercepted by the intermediate node and to be redirected to a third node (the "ISB") managing the actual billing.

This method features a system in which the node from which the information originates, does not need to have a physical or even a logical connection to the node that manages the actual billing. Rather, the intermediate node interprets the billing information as presented by the originating node by using the conventions of the above mentioned protocol and using the header field or fields. The intermediate node then negotiates the billing process with the third node responsible for the actual billing processes.

Figure 2:
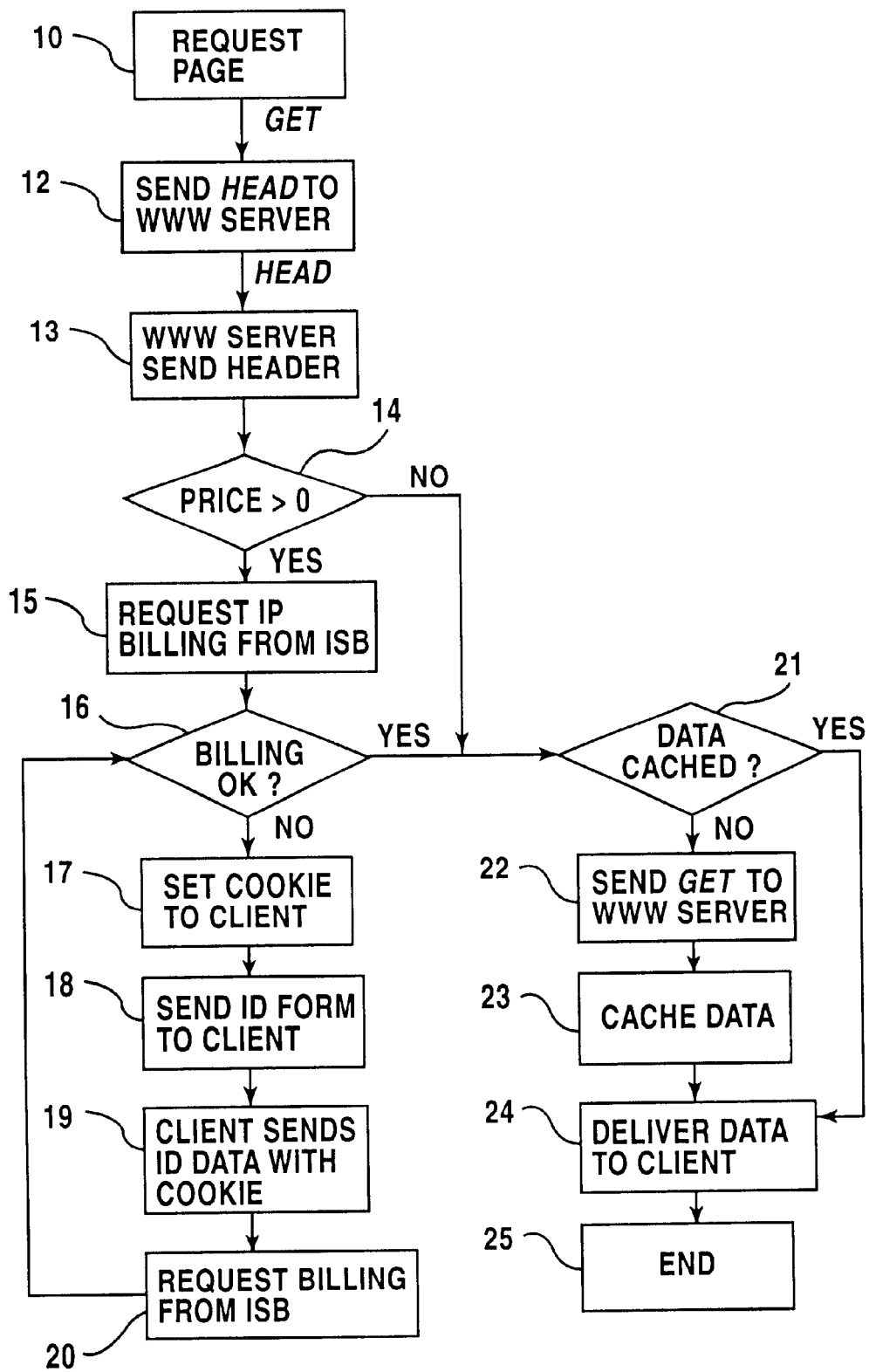
FIG. 2 is a flow chart according to one embodiment of the present invention.

FIG. 2 presents a transaction flow for the situation where a web page is requested from the WWW Server 3.

Client 1 requests 10 a page from the WWW Server 3 either by writing a specific Universal Resource Locator (URL) into its browser or by following a hypertext link from some other hypertext document. The browser dispatches a HTTP GET request. The request is cached by the proxy 2 which handles all the requests directed to the WWW Server 3. The proxy requests the header information from the WWW Server 3 by dispatching 12 a HEAD http request. In response to the HEAD request, the WWW Server 3 sends 13 the header information associated with the requested document to the proxy 2.

From this header information the proxy 2 parses out the billing and access information relating to the requested web page (the embedding of billing data is described in detail below). If the header information reveals that the requested resource has a price, but the proxy 2 has no valid cookie 14, the proxy 2 sends a billing request 15 to the ISB 5. When receiving this request, the ISB 5 attempts to identify the client 1 by identifying his terminal means. This can be done if the connection to the service is initiated from a known source such as an in-house modem bank or tele-operator, or an ISP managed Internet Access Point.

If the billing requires any additional information from the client 1, ISB 5 asks the proxy 2 to present the client 1 with an identification and confirmation page 18. Prior to dispatching any dialogues, the proxy 2 sends a cookie 17 to the client's browser. In this way, it can later match the responses with correct requests. From now on the client 1 always sends the set cookie with every request directed to the proxy 2 or the WWW Server 3.

After receiving and filling the requested identification or confirmation information, the client 1 sends the data and the cookie 19 back to the proxy 2. Using this information, the proxy 2 dispatches another billing request 20 to the ISB 5. After the ISB 5 acknowledges a successful billing, the proxy 2 attempts to locate the requested resource (or page) in its cache. If the resource is present in the cache, and the earlier retrieved header indicates that the resource remains valid, the proxy 2 delivers 24 the cached resource to the client 1. If the requested resource in not present in the cache, the original GET request is relayed 22 to the WWW Server 3.

Then the WWW Server sends the requested resource to the proxy 2, where it is cached and forwarded 24 to the client 1. This ends the billing and access control transactions 25.

Figure 3:
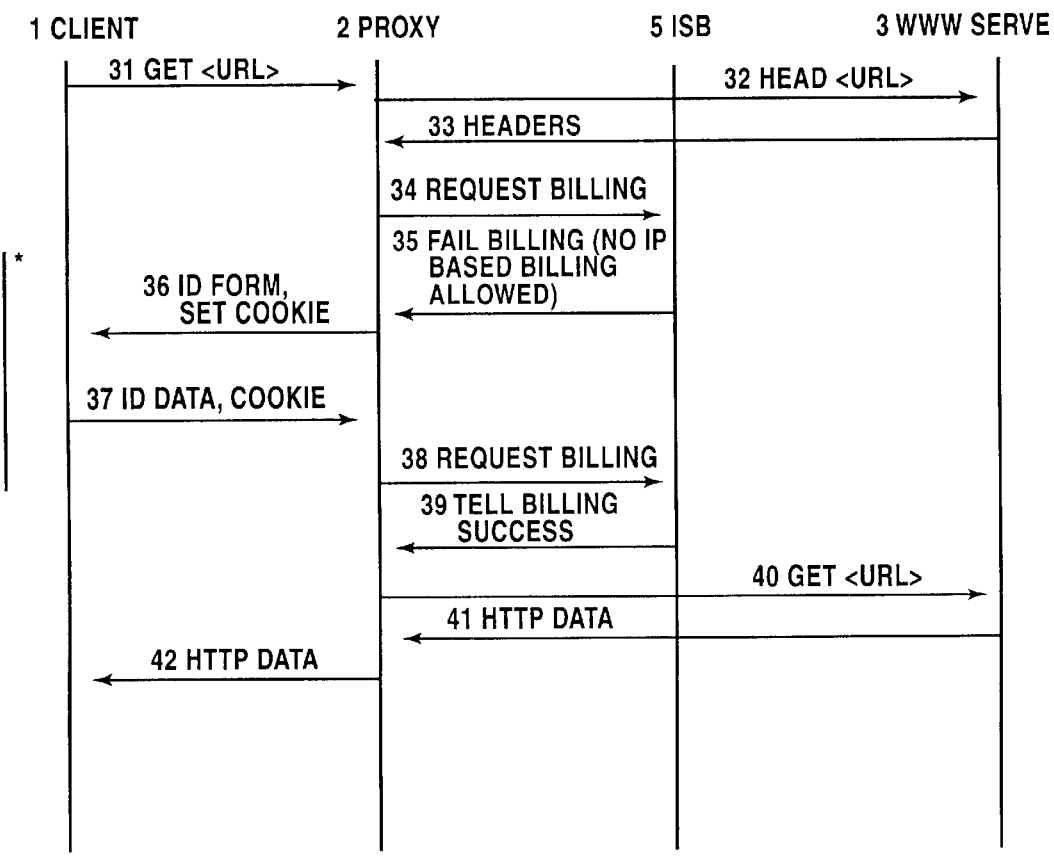
FIG. 3 is a message semantic diagram according to one embodiment of the present invention.

FIG. 3 is a message semantic diagram for the above described process, where the messages marked with "*" are not required if the billing can be done according to the identity of the User's terminal means.

The following embodiment is used when the present invention is implemented using the client defined HTTP header field with Apache WWW Server. The server is configured to add any new header information fields found at, for example, the .htaccess files. These files are used to attach access restrictions on certain files or directories containing files or other directories. The mechanism allows a default value to be specified for the whole directory or for specific proprietary values for specific files.

The following is an example ".htaccess" file which adds a new field "Price" to the HTTP messages.

<Directory /usr/local/httpd/commercial>

Header set Price 2.50

</Directory>

<Files /usr/local/httpd/commercial/expensive.html>Header set Price 4.95

</Files>

<Files /usr/local/httpd/commercial/cheapo.html>

Header set Price 1.95

</Files>

All files and directories located at the "commercial" directory are set to have a price of 2.50. In addition, the files "expensive.html" and "cheapo.html" are explicitly set the prices of 4.95 and 1.95 respectively.

It will be appreciated by the person of skill in the art that various modifications may be made to the above described embodiment without departing from the scope of the present invention. For example, whilst the above embodiment has been described with reference to retrieving data from a WWW server, the invention may also be applied to retrieving data from other types of data network servers and systems.

What is claimed is:

1. A method of downloading resources to a client from a content server over a data network, the method comprising the steps of:

sending a resource request message from the client;

intercepting the sent resource request message at a proxy located in the data network between the client and the content server;

sending a header request from the proxy to the content server requesting the content server to transmit a header, associated with the requested resource, to the proxy;

receiving the header at the proxy and determining whether or not the header contains billing and/or access restrictions;

in the event that the header does contain billing and/or access restrictions, authenticating the client's right to receive the requested resource; and providing the client is authenticated, delivering the resource request message from the proxy to the content server and subsequently downloading the resource from the content server to the client.

2. A method according to claim 1, wherein the step of authenticating the client's right to receive the requested resource comprises conducting an authentication dialogue with an Internet Service Broker (ISB).

3. A method according to claim 2, wherein the ISB is a software server platform which centralizes the logistic services on behalf of other content services.

4. A method according to claim 2, wherein the authentication step additionally comprises a dialogue between the ISB and the client following the setting up of the dialogue between the proxy and the ISB.

5. A method according to claim 1, wherein the proxy caches previously requested resources to minimize loading time of commonly requested resources, the method comprising determining whether or not a requested resource is present in the cache and, if present, whether or not the cached resource is valid based upon data contained in the received header, wherein if the resource is present and valid the resource is sent from the proxy to the client whilst said resource request message is not delivered from the proxy to the content server.

6. A method according to claim 1, wherein the proxy is a program running on a separate computer device placed in front of the computer device on which the content server is running.

7. A method according to claim 1, wherein the proxy is a program running on the same computer as the content server program.

8. A method according to claim 1, wherein the proxy conducts a confirmation dialogue with the client on the basis of instructions originating from an Internet Service Broker.

9. A proxy for controlling billing and access in a data network, the proxy comprising;

means for intercepting a resource request message sent from a client and intended for a content server;

means for sending a header request to the content server requesting the content server to transmit a header, associated with the requested resource, to the proxy;

means for receiving the transmitted header and for determining whether or not the header contains billing and/or access restrictions;

means for authenticating the client's right to receive the requested resource in the event that the header does contain billing and/or access restrictions; and means for delivering the resource request message to the content server in the event that the client is authenticated.

10. A computer memory encoded with executable instructions representing a computer program for causing a computer system connected to a data network to operate as a proxy, the proxy operating to:

intercept a resource request message sent from a client and intended for a content server;

send a header request to the content server requesting the content server to transmit a header, associated with the requested resource, to the proxy;

receive the transmitted header and for determining whether or not the header contains billing and/or access restrictions;

authenticate the client's right to receive the requested resource in the event that the header does contain billing and/or access restrictions; and deliver the resource request message to the content server in the event that the client is authenticated.

* * * * *